United States Patent [19]

Roth et al.

[11] 4,176,922
[45] Dec. 4, 1979

[54] MICROPHONE ARRANGEMENT IN A SOUND MOVIE CAMERA

[75] Inventors: Johann Roth, Schwabhausen; Peter Schneider, Kronberg, both of Fed. Rep. of Germany

[73] Assignee: Braun Aktiengesellschaft, Frankfurt, Fed. Rep. of Germany

[21] Appl. No.: 895,716

[22] Filed: Apr. 12, 1978

[30] Foreign Application Priority Data

Jun. 18, 1977 [DE] Fed. Rep. of Germany ....... 2727496

[51] Int. Cl.$^2$ ............................................. G03B 31/02
[52] U.S. Cl. ..................................... 352/27; 179/150; 179/155
[58] Field of Search .................. 179/150, 155; 352/11, 352/27, 174, 175, 176, 140

[56] References Cited

U.S. PATENT DOCUMENTS

| 2,197,691 | 4/1940 | Gerlach | 179/155 |
| 2,783,677 | 3/1957 | Becker | 352/11 |
| 3,483,898 | 12/1969 | Tini | 179/155 |
| 3,876,296 | 4/1975 | Custer | 352/27 |
| 3,963,333 | 6/1976 | Mueller et al. | 352/141 |

*Primary Examiner*—Monroe H. Hayes
*Attorney, Agent, or Firm*—Michael J. Striker

[57] ABSTRACT

In a sound movie camera, an arrangement comprising a recess in the housing of the camera for accommodating an extendable supporting rod or band at the free end of which is connected a microphone. In a preferred embodiment, the extendable supporting member is accommodated in a grip handle of the movie camera.

7 Claims, 5 Drawing Figures

MICROPHONE ARRANGEMENT IN A SOUND MOVIE CAMERA

BACKGROUND OF THE INVENTION

The invention relates generally to sound movie cameras and, more particularly, it relates to a sound movie camera having a housing provided with a microphone electrically connected to the sound recording device of the camera.

For some time now, films in the form of so-called Super-8 Cassettes have been available on the market for use by amateurs; such cassettes are substantially easier to operate than the previous normal 8 mm sound films. The taking of pictures by means of amateur sound movie cameras that employ the aforementioned cassettes, has nonetheless certain drawbacks. It is, for example, disturbing that the noise of the running camera is picked up by the microphone and recorded on the sound tracks of the film. It is possible to reduce the undesirable influence of the camera noise by placing the microphone a relatively large distance from the camera during the picture taking operation.

It has been also proposed to mount the microphone on the arm of the camera operator in such a manner that during the picture taking operation it is directed in the acoustically desirable direction and is spaced at such a distance from the camera that the disturbing noises transmitted from the camera are negligible (German Offenlegungsschrift No. 24 32 136). Even if this solution results in a very good acoustical separation, it has nevertheless the disadvantage that the microphone and the camera are completely separate pieces and that they there tend to be misplaced by the operator.

In order to keep the camera and the microphone together, sound movie cameras have been devised where the microphone is mounted on the body of the camera and telescopically extendable therefrom (magazine "Photo" 1976, II, page 32, 34, and German Pat. No. 7,628,266.5 De.). The disadvantage of this camera-microphone combination is that the microphone arranged on the camera body makes the whole structure bulky and difficult to manipulate.

In another sound movie camera the microphone is fixedly mounted on the free end of a forwardly directed and downwardly inclined handle of the camera (Kodak Ektasound 240, Kodak Consumer Markets Division, Rochester, New York 14650). This arrangement has the disadvantage that the microphone is immovable relative to the camera body and therefore optimum use of it can be made only in special picture taking situations.

SUMMARY OF THE INVENTION

It is, therefore, the primary object of the present invention to avoid the disadvantages of the aforedescribed prior art microphone arrangements in sound movie cameras.

In particular, an object of this invention is to reduce to a minimum the recording of camera noises while maintaining the microphone as a part of the sound movie camera.

Another object of this invention is to dispense with extension cables and separate connecting parts between the microphone and the camera.

Still another object of this invention is to facilitate substantially the operation and handling of the sound movie camera.

According to this invention, the above objects are attained by providing a recess in the camera housing for accommodating at least a portion of the microphone and further for accommodating an extendable supporting rod or band connected between the housing and the microphone for supporting the same in its unfolded position out of the housing. The extendable supporting rod is either a telescoping rod or a coiled steel or plastic tape or band having an arched cross-section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
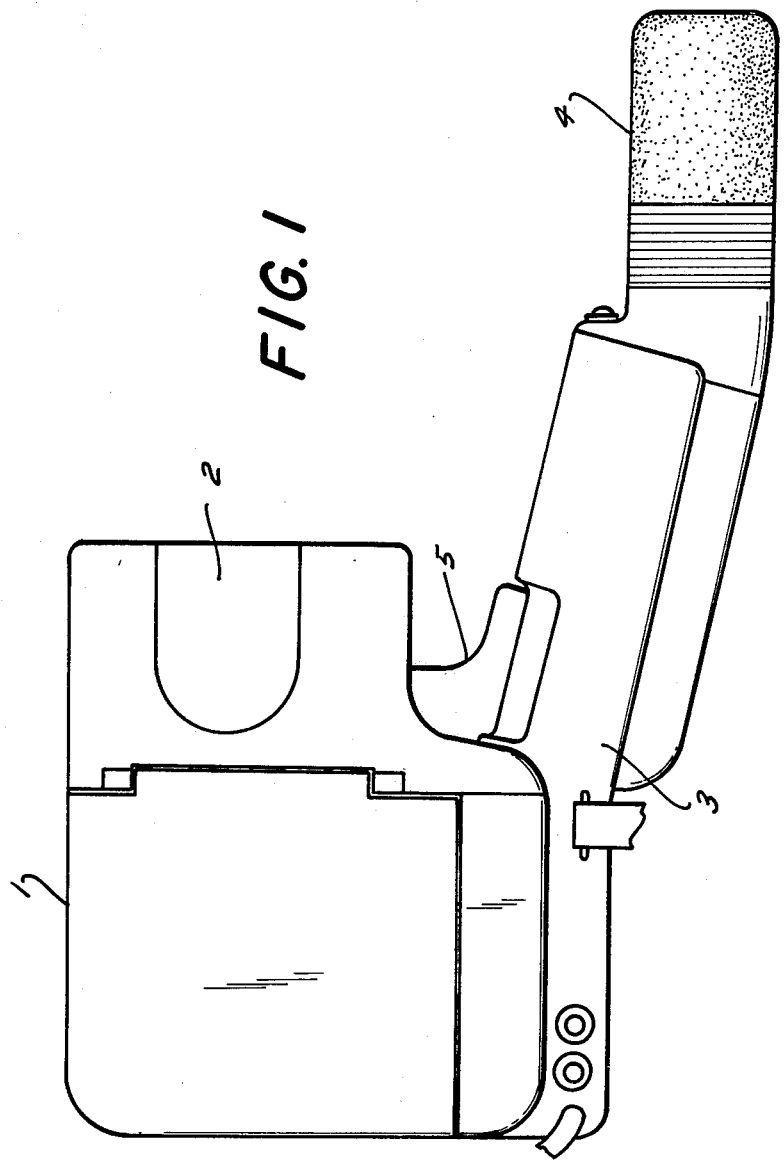
FIG. 1 is a side view of a sound movie camera having a built-in microphone.
Figure 2:
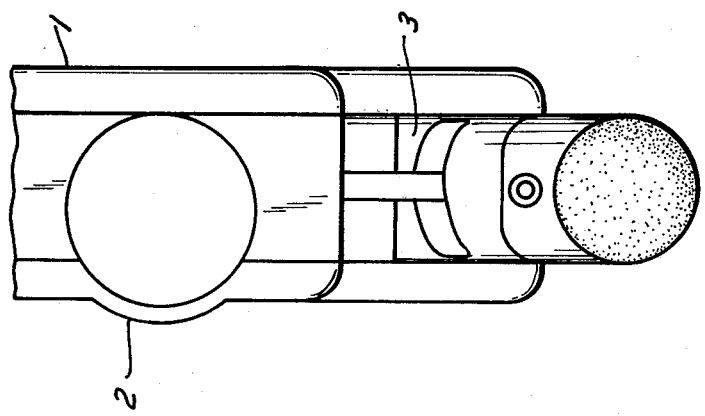
FIG. 2 is a front view of the movie camera of FIG. 1.

Referring to FIGS. 1 and 2, there is shown a housing of a sound movie camera including a rear housing portion 1, a bulged front housing portion 2 for receiving an objective and a handle 3 supporting on its free end a microphone 4. The microphone is detachably connected to the handle 3 and in FIGS. 1 and 2 is shown in its folded position.

Figure 3:
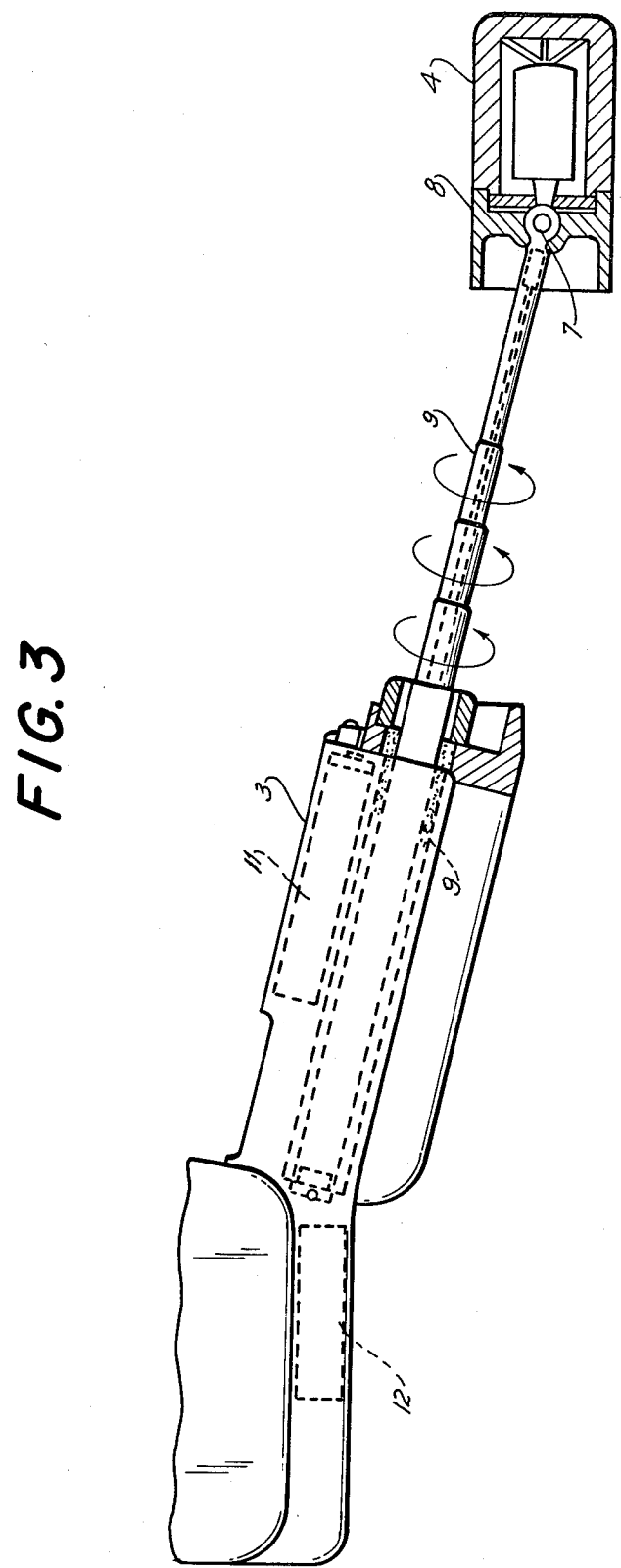
FIG. 3 is a sectional side view of the camera handle with an unfolded telescopic rod supporting the microphone.

FIG. 3 shows the microphone in its unfolded position. The microphone element 4 is mounted on a supporting base 8 that is open at the other end to form a cup-shaped socket adapted for receiving a ball end 7 of a telescopic rod 9. The other end of the rod 9 is secured to the bottom of a recess in the camera handle 3 and the upper part of the recess is extended in size to receive the supporting base 8 of the microphone element 4. In order to minimize the transfer of noises from the camera to the telescopic rod 9, a foam rubber lining 10 is provided between the wall of the recess in the camera handle and the outermost part of the telescopic rod that remains embedded in the recess. The camera handle may be provided with additional recesses 11 and 12 for accommodating batteries either for the microphone or for the sound recording device in the camera. The arrangement shown in FIG. 3 makes it possible to unfold the microphone 4 in its extended position as shown in this Figure, or to fold it into engagement with the matching recess at the free end of the camera handle. In addition, due to the ball end 7 the microphone may be angularly adjusted to any desired pick-up position.

Figure 4:
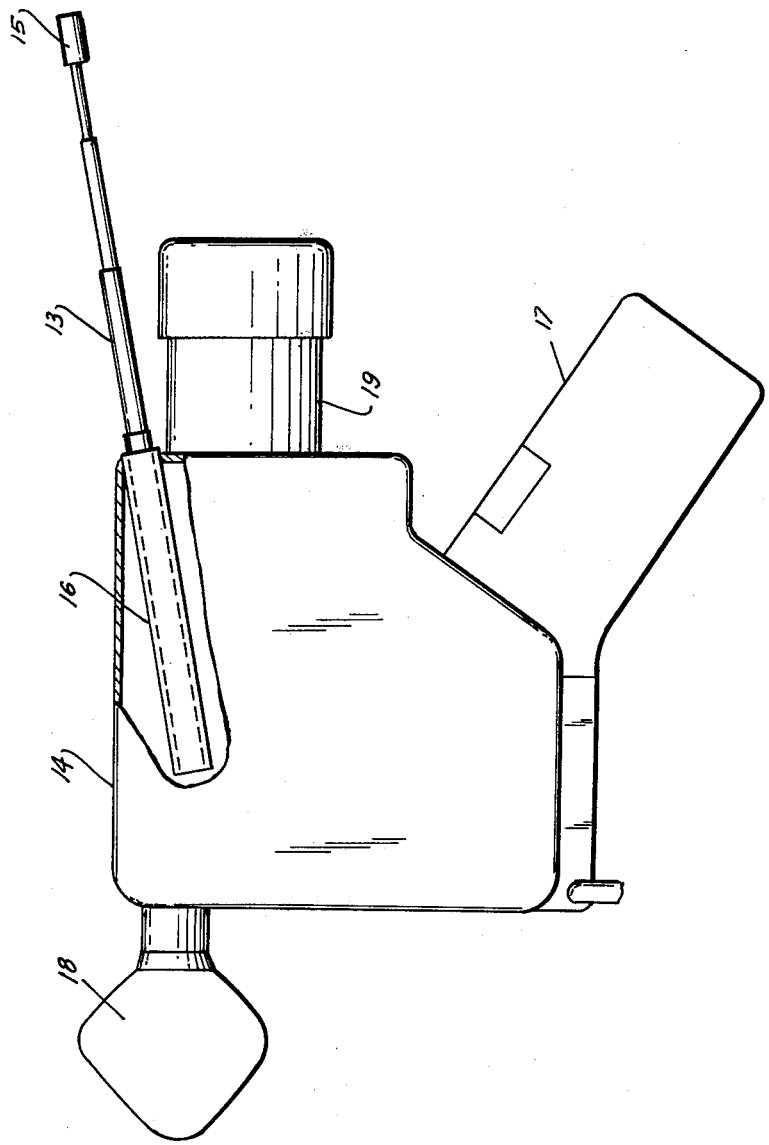
FIG. 4 is a modification of the arrangements for the telescopic support of the microphone.

FIG. 4 shows a modification of the arrangement of the extendable support 13 on the camera housing 14. In this modification, the telescopic support 13 is arranged at the top portion of the camera housing 14 and directed upwardly at an acute angle to the optical axis of the camera. The microphone 15 in this embodiment may be again attached to the free end of the telescopic support 13 by means of a ball-and-socket connection and similarly as in the preceding embodiment a foam rubber or foam plastic layer 16 surrounds the part of the telescopic support 13 that has the largest diameter and is embedded in the camera housing 14 so that noises resulting from the movement of the camera drive can be effectively damped. The rest of the camera is designed in conventional manner, comprising a handle 17, an objective 19 and a rubber eye cup 18 for covering the eye of the operator during the picture taking action.

The angle defined between the optical axis of the camera and the telescopic support 13 corresponds to the maximum cone of light rays that can be received by the objective 19 during the film-taking operation so that the microphone 15 does not interfere with the field of vision of the camera.

Figure 5:
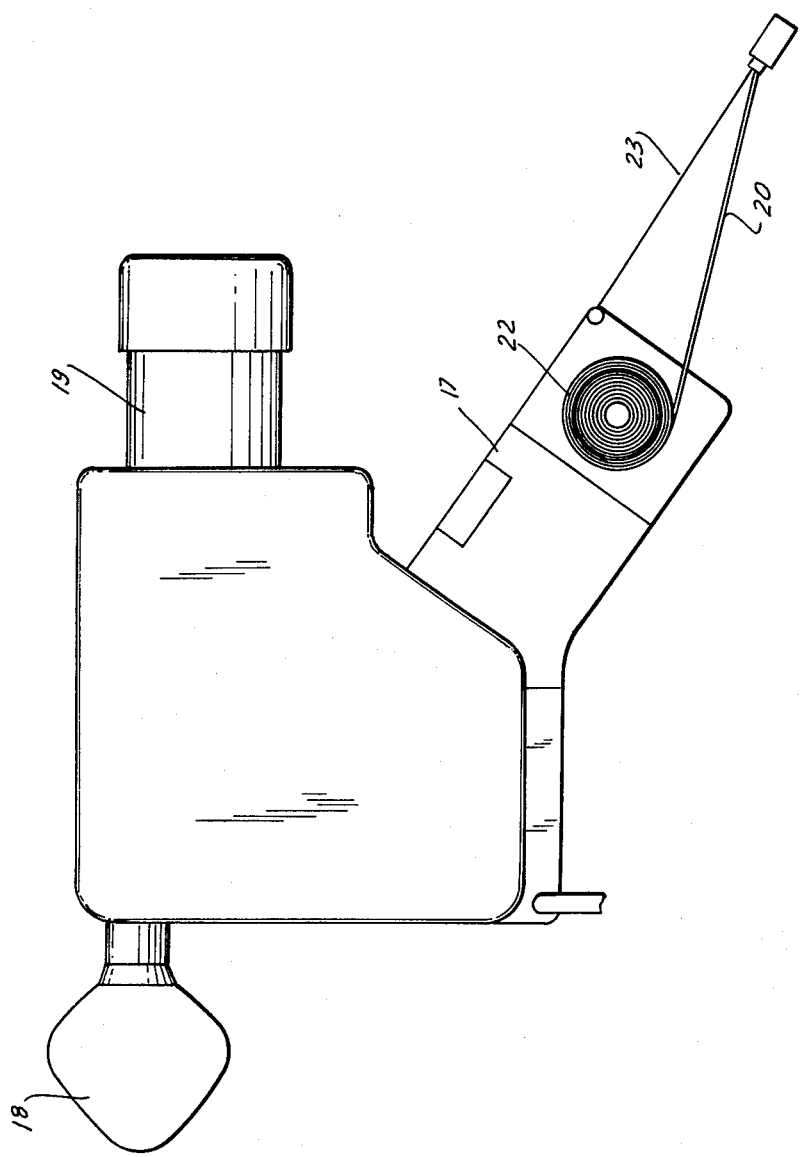
FIG. 5 is a side view of a camera showing schematically an extendable, microphone supporting member in the form of a coiled steel band.

FIG. 5 shows still another modification of this invention wherein the extendable support is in the form of a coiled band similar to a metal band ruler. The extendable support 20 is arranged in a recess at the bottom portion of a camera handle 17 and is spring biased by a spring (not shown) controlled by a pushbutton 22. The metal band 20 is arched in transversal direction so that when pulling the band 20 out of the camera handle 17, it keeps straight in its extended position. By pressing the pushbutton 22, the spring retrieves the extended band back into the camera handle 17.

Instead of an arched metal band, there can be employed also a band of synthetic material whose mechanical stability is enhanced by means of electrical conductors embedded therein. An auxiliary cord 23 assists the steel band or the plastic band 20 in supporting the microphone and also may be employed for adjusting the position of the microphone in the desired direction.

It will be understood that each of the elements described above, or two or more together, may also find a useful application in other types of sound movie camera differing from the type described above.

What is claimed as new and desired to be protected by Letters Patent is set forth in the appended claims.

I claim:

1. In a sound movie camera having a housing accommodating a sound-recording circuitry and a microphone displaceable between a folded position in which the microphone is at least partially received in the housing and an unfolded position in which the microphone is completely removed from the housing, an arrangement comprising a recess in the housing for accommodating at least a portion of the microphone; and extendable means fully disposed within said recess when the microphone is in the folded position thereof and at least partially disposed in said recess when the microphone is in the unfolded position, said means being connected between the housing and the microphone for supporting the latter in the unfolded position out of the housing and connecting the microphone with the sound-recording circuitry in the housing so as to eliminate the necessity for separate mechanical and electrical connecting elements when the microphone is in the unfolded position, to thereby simplify the operation and handling of the sound movie camera.

2. An arrangement as defined in claim 1; said housing including a camera handle, said microphone and said extendable means being disposed within said handle.

3. An arrangement as defined in claim 1, wherein said recess and said extendable means are directed parallel to the maximum cone of light rays received during the picture taking operation by the camera.

4. An arrangement as defined in claim 1, wherein said extendable means is a telescopic rod.

5. An arrangement as defined in claim 1, wherein said extendable means is a coiled band having an arched transverse cross-section.

6. An arrangement as defined in claim 5, wherein said coiled band is a steel band supporting at least one electrical conductor.

7. An arrangement as defined in claim 5, wherein said coiled band is a transversely arched synthetic plastic band including an embedded pair of electrical conductors.

* * * * *